(12) United States Patent
Fatemi et al.

(10) Patent No.: US 10,666,099 B1
(45) Date of Patent: May 26, 2020

(54) SLOTTED PERMANENT MAGNETS FOR ELECTRIC MACHINES

(71) Applicant: GM Global Technology Operations LLC, Detroit, MI (US)

(72) Inventors: Alireza Fatemi, Canton, MI (US); Thomas W. Nehl, Shelby Township, MI (US); David J. Brooks, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/199,868

(22) Filed: Nov. 26, 2018

(51) Int. Cl.
*H02K 1/27* (2006.01)
*H02K 7/00* (2006.01)
*H02K 15/03* (2006.01)

(52) U.S. Cl.
CPC ............ *H02K 1/276* (2013.01); *H02K 7/006* (2013.01); *H02K 15/03* (2013.01)

(58) Field of Classification Search
CPC .... H02K 1/2786; H02K 1/276; H02K 1/2706; H02K 1/278; H02K 1/2773
See application file for complete search history.

(56) References Cited

U.S. PATENT DOCUMENTS

| | | | |
|---|---|---|---|
| 2,990,508 A | 6/1961 | Thompson | |
| 5,166,568 A | 11/1992 | Nystuen et al. | |
| 6,163,127 A | 12/2000 | Patel et al. | |
| 6,359,359 B1 * | 3/2002 | Miura | H02K 1/276 310/156.08 |
| 6,674,205 B2 | 1/2004 | Biais et al. | |
| 7,969,058 B2 | 6/2011 | Rahman et al. | |
| 8,847,454 B2 * | 9/2014 | Saito | H02K 1/276 310/156.57 |
| 8,928,197 B2 | 1/2015 | Jurkovic et al. | |
| 8,933,606 B2 | 1/2015 | Rahman et al. | |
| 2006/0017345 A1 | 1/2006 | Uchida et al. | |
| 2007/0216249 A1 | 9/2007 | Gruendel et al. | |
| 2009/0045688 A1 | 2/2009 | Liang et al. | |
| 2010/0244610 A1 | 9/2010 | Hao et al. | |
| 2011/0062902 A1 | 3/2011 | Patel et al. | |
| 2011/0109180 A1 | 5/2011 | Akutsu et al. | |
| 2011/0169363 A1 | 7/2011 | Summers et al. | |
| 2011/0198962 A1 | 8/2011 | Tang | |
| 2013/0147303 A1 | 6/2013 | Kaiser et al. | |
| 2013/0270952 A1 | 10/2013 | Jurkovic et al. | |
| 2014/0252903 A1 | 9/2014 | Rahman et al. | |

* cited by examiner

*Primary Examiner* — Dang D Le
(74) *Attorney, Agent, or Firm* — Quinn IP Law

(57) ABSTRACT

Presented are slotted permanent magnets (PM) for electric machines, motor generator units using slotted PMs, methods for making/using slotted PMs, and motor vehicles equipped with an electric traction motor using slotted PMs. An electric machine includes an annular stator with a hollow core and one or more internal stator slots. One or more electrically conductive windings is/are disposed in the stator slot(s). A cylindrical rotor is rotatably disposed inside the hollow core of the stator. One or more permanent magnets is/are mounted to the rotor. Each permanent magnet includes a rigid, single-piece PM body with opposing first and second faces. A first set of elongated grooves is recessed into the first face. An optional second set of elongated grooves is recessed into the second face. Each of the grooves has a depth that is substantially parallel to a direction of a magnetic field generated by the permanent magnet.

20 Claims, 4 Drawing Sheets

SLOTTED PERMANENT MAGNETS FOR ELECTRIC MACHINES

INTRODUCTION

The present disclosure relates generally to electric machines. More specifically, aspects of this disclosure relate to permanent magnets for electromechanical motor/generator units (MGU) of hybrid-electric and full-electric vehicle powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through a manually or automatically shifted multi-speed transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full electric vehicles, on the other hand, utilize alternative power sources to propel the vehicle and, thus, minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel system, and exhaust system of an ICE-based vehicle are replaced with an electric motor, a traction battery pack, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. A hybrid electric vehicle (HEV), for example, is generally equipped with an ICE assembly and an electric machine (E-machine), often in the form of a motor/generator unit (MGU), that operate individually or cooperatively to generate tractive power. Since hybrid vehicles are able to derive their power from sources other than the engine, engines in HEVs may be turned off, in whole or in part, while the vehicle is propelled by the electric motor(s).

While innumerable options are available, there are three primary types of electric machines used for traction motors in modern electric-drive vehicle powertrains: brushed direct current (DC) motors, brushless permanent magnet (PM) motors, and multiphase alternating current (AC) motors. Permanent magnet motors have a number of operating characteristics that make them more attractive for use in vehicle propulsion applications when compared to their available counterparts, including high efficiency, high torque, high power densities, and a long constant-power operating range. A PM motor is an electric machine that converts electrical energy into rotational mechanical energy using a stator with multiphase electromagnetic windings, and a rotatable rotor that bears an arrangement of permanent magnets. Permanent magnet motors may be categorized to DC or AC, rotary or linear, and radial flux or axial flux. In radial flux PM motor designs, the magnet-bearing rotor may be nested inside the stator or situated outside the stator. Alternatively, a PM motor may take on an axial flux arrangement in which the stator and rotor are facing, coaxial disks. The rotor, which has multiple surface-mounted or interior-mounted permanent magnets, is separated from the stator by a small air gap. A magnetic field produced by the flow of current through the stator windings interacts with a magnetic field produced by the rotor's PMs, thereby causing the rotor to rotate.

SUMMARY

Disclosed herein are slotted permanent magnets (PM) for electric machines, electromechanical motors and generator units using such slotted PMs, methods for making and methods for using such slotted PMs, and motor vehicles equipped with an electric traction motor using such slotted PMs. By way of example, and not limitation, there are presented manufacturing systems and methods for fabricating the solid body of a permanent magnet with a preselected pattern of surface grooves that is engineered to reduce eddy current losses during operation of an accompanying electric machine. These grooves may be generated by precision tooling, extrusion, stamping, or by adding the features during a sintering process. The surface grooves may comprise a first set of mutually parallel, rectilinear grooves that is orthogonal with a second set of mutually parallel, rectilinear grooves. Each elongated groove may have a polygonal or ovate cross-section with a depth that is greater than its width (e.g., at least a 3:1 depth to width ratio). The groove depth is less than the thickness of the permanent magnet such that the grooves do not extend through PM body. The tooling to generate the surface grooves may take on a variety of geometrical shapes and sizes, with the tooling path (groove depth) performed in planes parallel to the direction of the impinging magnetic field. These grooves may be introduced on a single side, opposing sides, multiple select sides, or all sides of the PM body. For some implementations, the PM body is a rectangular polyhedron with recessed grooves formed into the opposing major faces with the greatest surface areas, with each side having a distinct pattern of grooves.

The solid PM body may take on innumerable shapes and sizes, including rectangular block magnets, annular magnets, bread-loaf magnets, curved tile magnets, etc. In addition, the direction of PM magnetization during operation of the electric machine may include radial, parallel, or any combination of the two. A foreseeable application for any of the disclosed slotted permanent magnets includes multiphase synchronous PM traction motor/generator units (MGU) for electric-drive vehicles. Permanent magnet synchronous motor applications include radial-flux and axial-flux machines with interior or surface mounted PMs. It is envisioned, however, that disclosed slotted PMs may be applied to any electric machine that utilizes permanent magnets. Optionally, the surface grooves may be filled with high-resistivity bonded magnets or other filler materials engineered to increase magnetic field density and improve mechanical strength. As a further option, the PM surface grooves may be filled with a high-resistivity epoxy to further improve eddy current loss abatement. In addition to loss reduction, the superficial grooves may be designed to mechanically fasten the magnets to a complementary support body, such as a rotor of a PM electric machine, for added retention strength. High-strength ties or clips may be used to fasten the PM body to the rotor; alternatively, the rotor may be fabricated with complementary interlocking features that slide into or interference fit with the PM's surface grooves.

Aspects of this disclosure are directed to electric machines, such as motors, generators, transformers, etc., that employ slotted permanent magnets to generate magnetic fields. Presented herein, for example, is an electric machine with a stator having a hollow core and one or more slots. One or more electrically conductive windings is/are disposed in the stator slot(s). The electric machine also includes a rotor that is movable with respect to the stator, and one or more permanent magnets mounted onto or into the rotor. For some applications, the rotor may be rotatably disposed inside the stator's hollow core. Each permanent magnet includes a rigid, single-piece PM body with opposing first and second faces. A first set of elongated grooves is recessed into the first face, and an optional second set of elongated grooves is recessed into the second face. Each groove has a depth that is substantially parallel to a direction of a time-varying magnetic field generated by the electrified conductive winding(s). For at least some applications, the superficial grooves may all share a common depth and shape; alternatively, one or more of the grooves may have a distinct shape and/or size.

Other aspects of the disclosure are directed to electric-drive motor vehicles equipped with a traction motor that employs slotted permanent magnets to generate magnetic fields. As used herein, the term "motor vehicle" may include any relevant vehicle platform, such as passenger vehicles (REV, BEV, PHEV, FEV, etc.), commercial vehicles, industrial vehicles, tracked vehicles, off-road and all-terrain vehicles (ATV), motorcycles, farm equipment, boats, planes, etc. In an example, an electric-drive motor vehicle includes a vehicle body with multiple road wheels operatively attached to the vehicle body. An electric traction motor is mounted onto the vehicle body and electrically connected to an on-board battery pack. The traction motor may operate alone (e.g., in a full-electric vehicle (FEV) application) or in conjunction with an internal combustion engine (e.g., in a hybrid-electric vehicle (HEV) application) to drive one or more of the vehicle wheels to thereby propel the vehicle.

The electric traction motor in the above example includes an annular stator that is fabricated with a hollow core and multiple stator slots. Multiple electrically conductive windings are disposed in these stator slots. The traction motor also includes a cylindrical rotor that is rotatably disposed inside the stator's hollow core, and multiple permanent magnets that are mounted on the outer surface of the rotor or inside complementary slots in the rotor. Each permanent magnet is fabricated with a rigid, single-piece PM body with opposing major faces (largest surface areas) adjoining opposing minor faces (smaller surface areas). A first set of elongated grooves arranged in a crisscross pattern is recessed into the first major face, and a second set of elongated grooves arranged in a crisscross pattern is recessed into the second major face. Each groove depth is substantially parallel to the direction of the time-varying magnetic field generated by the electrified windings.

Additional aspects of the disclosure are directed to methods for making and methods for using any of the disclosed slotted permanent magnets, electric machines, motor/generator units, and vehicles. In an example, a method is presented for assembling an electric machine. This representative method includes, in any order and in any combination with any of the above and below disclosed options and features: providing a stator with a hollow core and defining a stator slot; positioning an electrically conductive winding in the stator slot; positioning a rotor adjacent the state (e.g., inside the stator's hollow core); and, mounting a permanent magnet to the rotor. The permanent magnet has a rigid, single-piece PM body with opposing first and second faces. A first set of elongated grooves is recessed into the first face. Each of the grooves has a depth that is substantially parallel to a direction of a time-varying magnetic field generated by the electrified conductive winding.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
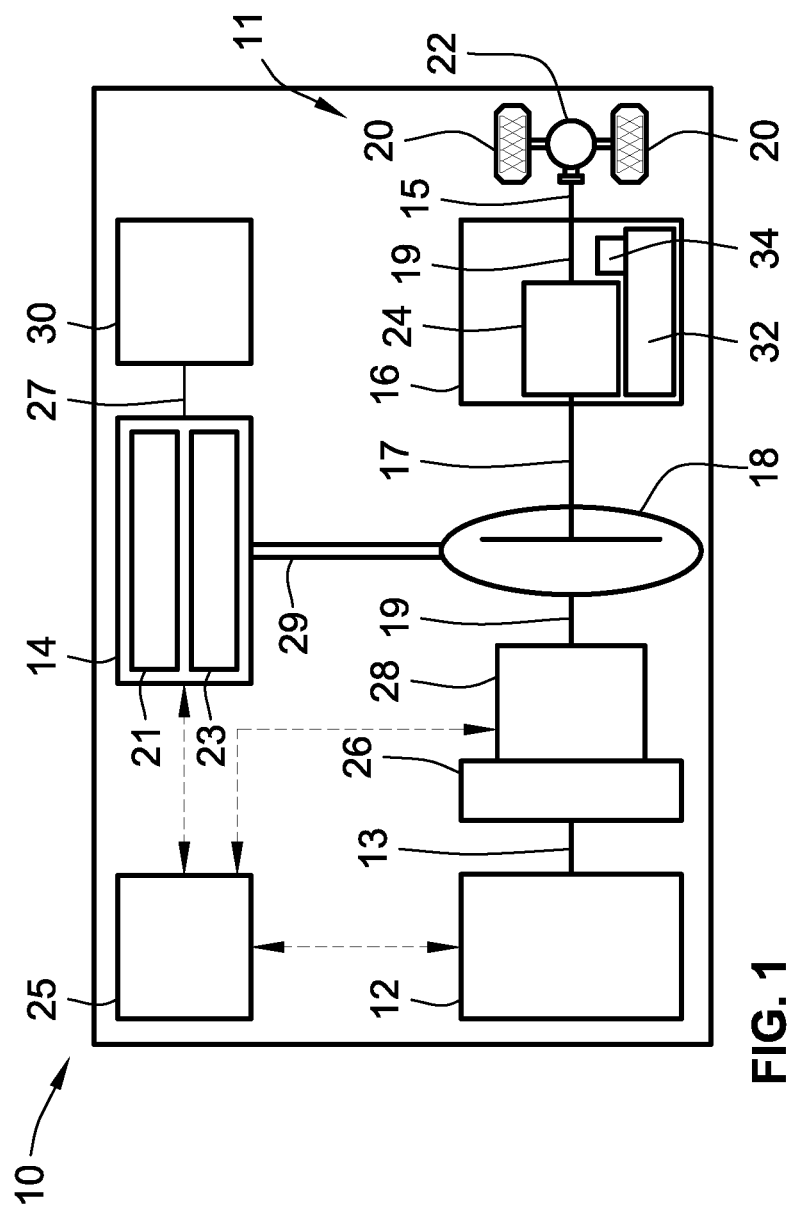
FIG. 1 is a schematic illustration of a representative electric-drive vehicle with a hybrid electric powertrain having an electric motor/generator unit (MGU) with slotted permanent magnets in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel P2 hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure can be practiced. In the same vein, implementation of the present concepts into a multiphase, synchronous permanent magnet (PM) motor generator unit (MGU) should also be appreciated as an exemplary application of the novel concepts disclosed herein. As such, it will be understood that aspects and features of the disclosure can be applied to other electric machine configurations and utilized for any logically relevant type of motor vehicle. Lastly, only select components have been shown and will be described in additional detail herein. Nevertheless, the vehicles and electric machines discussed below can include numerous additional and alternative features, and other well-known peripheral components, e.g., for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16. The engine 12 transfers power, preferably by way of torque via an engine crankshaft 13 (or "engine output member"), to an input side of the transmission 16. According to the illustrated example, the ICE assembly 12 rotates an engine-driven (first) torsional damper assembly 26 and, through the torsional damper assembly 26, an engine disconnect clutch 28. This engine disconnect clutch 28, when operatively engaged, transmits torque received from the ICE assembly 12 by way of the damper 26 to input structure of the TC 18. The transmission 16, in turn, is adapted to receive, selectively manipulate, and distribute tractive power from the engine 12 to the vehicle's final drive system 11—represented herein by a driveshaft 15, rear differential 22, and a pair of rear road wheels 20—and thereby propel the hybrid vehicle 10. The power transmission 16 and hydrokinetic torque converter 18 of FIG. 1 share a common transmission oil pan or "sump" 32 for supply of transmission fluid, as well as a shared transmission pump 34 for sufficient hydraulic pressure to activate the elements of the transmission 16, TC 18, and clutch 28.

The ICE assembly 12 operates to propel the vehicle 10 independently of the motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a two or four-stroke compression-ignited diesel engine or a four-stroke spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc.

FIG. 1 also depicts an electric motor/generator unit 14 or other suitable traction motor that operatively connects via a motor support hub 29 (or "motor output member") and torque converter 18 to an input shaft 17 (or "transmission input member") of the electro-hydraulic transmission 16. The motor/generator unit 14 can be directly coupled onto a TC input shaft or rigidly mounted to a housing portion of the torque converter 18. The electric motor/generator unit 14 is composed of an annular stator 21 circumscribing and concentric with a cylindrical PM-bearing rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30, e.g., via regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, such as PS, P1, P3, and P4 hybrid powertrains, any of which may be adapted for an REV, PHEV, range-extended hybrid vehicle, fuel-cell hybrid vehicle, etc.

Power transmission 16 can use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and clutch 28. Control module, module, controller, control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), combinational logic circuit(s), input/output circuit(s) and devices, etc., whether resident, remote, or a combination of both. The foregoing hardware may be configured to execute one or more software or firmware programs or routines, e.g., using appropriate signal conditioning and buffer circuitry, and other components to provide the described functionality. Software, firmware, programs, instructions, routines, code, algorithms and similar terms may be defined to mean any controller-executable instruction sets, including calibrations and look-up tables. An ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use. Alternatively, routines may be executed in response to occurrence of an event during operation of the vehicle 10.

Figure 2:
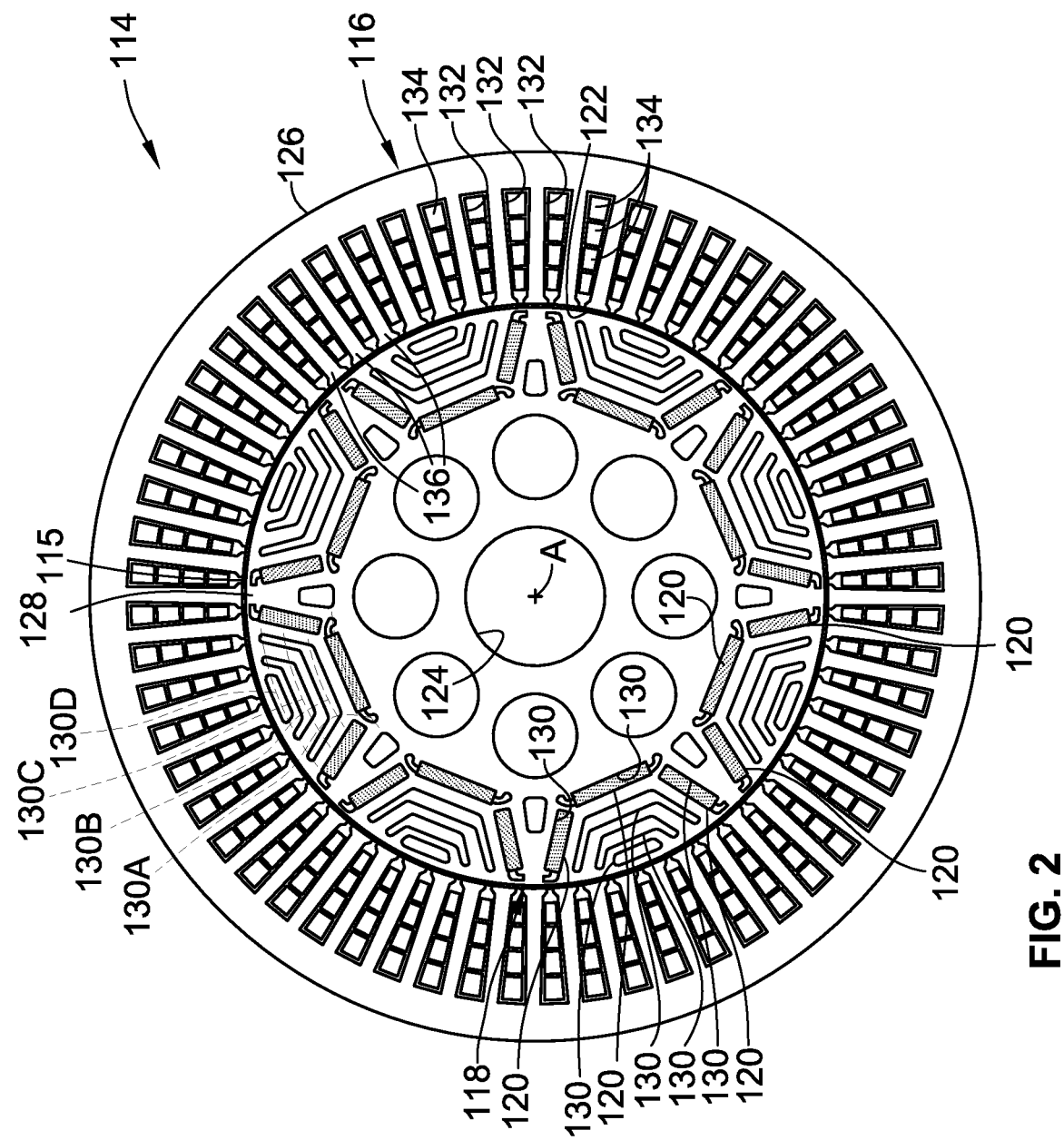
FIG. 2 is a schematic side-view illustration of a representative electric machine with a rotor assembly bearing multiple slotted permanent magnets in accordance with aspects of the present disclosure.

FIG. 2 illustrates another example of a PM-type electric machine 114 that employs slotted permanent magnets to convert electrical energy into mechanical energy, and vice versa. As discussed herein, the electric machine 114 has a multi-phase stator assembly 116 that nests therein and circumscribes an interior PM-assisted synchronous reluctance rotor assembly 118. While available for use in automotive and non-automotive applications alike, the electric machine 114 may be particularly suited for use in a hybrid electric powertrain as a traction motor (e.g., motor 14 FIG. 1) with an engine (e.g., ICE assembly 12), and to operate in at least an engine-cranking mode, a regenerative-charging mode, and a torque-assist mode. Electric machine 114 may be designed to achieve: a relatively high efficiency, such as about 85% efficiency over a calibrated output power and speed range; a relatively high power density (e.g., greater than about 1500 watts per liter) and torque density (e.g., greater than about 5 Newton-meters per liter); a relatively wide peak power range (e.g., about 4 to 6 kilowatts or greater); a maximum speed of at least about 18,000 rpm; a reduced cost (e.g., by minimizing the number of permanent magnets); a reduced mass and inertia (e.g., for fast dynamic response to user output demands); and to fit into a relatively small packaging space. Various alternative embodiments, including alternative rotor assembly architectures and/or alternative stator assembly architectures, may be employed by the electric machine 114 to meet similar or alternative operating parameters.

With continuing reference to FIG. 2, the stator assembly 116 is coaxial with and surrounds the rotor assembly 118 while maintaining a small air gap 115 therebetween. In accord with the illustrated example, this air gap 115 may be not less than about 0.2 millimeters (mm) and not greater than about 1.0 mm, for example, in order to maximize power output and minimize the number of slotted permanent magnets 120 borne by the rotor assembly 118 to provide the desired power output. The representative stator and rotor assemblies 116, 118 of FIG. 2, both of which are portrayed as truncated right-circular cylinders with a generally annular shape, are concentrically aligned about a longitudinal center axis A of the electric machine 114. The stator assembly 116 has a hollow stator core 122 that nests therein the rotor assembly 118; the rotor assembly 118 has a hollow rotor core 124, e.g., that splines to a motor shaft (not shown). It should be appreciated that a protective motor housing (also not shown) can surround an outer periphery of the stator's body 126 and can support the motor shaft of the electric machine 114.

Rotor assembly 118 of FIG. 2 is fabricated with a rotor body 128 that supports multiple permanent magnets 120 circumferentially spaced around the rotor core 124. Specifically, the rotor body 128 is precision machined with multiple rotor slots 130 arranged in radially spaced barrier layers (e.g., four distinct barrier layers). A first barrier layer 130A of slots 130 may be positioned closest to an inner periphery of the rotor body 128, while a fourth barrier layer 130D of slots 130 may be positioned furthest from the rotor body's inner periphery than the barrier layers. A second barrier layer 130B of slots 130 may be radially interposed between the first and third barrier layers 130A, 130C, while the third barrier layer 130C of slots 130 may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as air barriers. In other embodiments, only one or all of the barrier layers may comprise slots storing therein permanent magnets. For example, the three radially innermost barrier layers 130A-130C may be filled with magnets 120 while the radially outermost barrier layer 130D does not include magnets 120. The rotor body 128 may be fabricated from a metallic material, including a high-grade steel material, that is engineered to maintain high speed rotational stress within predetermined limits.

Stator assembly 116 of FIG. 2 is fabricated with a stator body 126 that has multiple radially elongated, circumferentially spaced stator slots 132 (e.g., 60 total slots). These stator slots 132 extend longitudinally through the stator body 126 along the axis A. The stator slots 132 are configured to house electrically conductive, multiphase stator windings 134. The stator windings 134 may be grouped into different sets, each of which may carry an identical number of phases of electrical current, such as three, five, six, or seven phases. In addition, the stator windings 134 may extend axially beyond the longitudinal ends of the stator body 126. A ratio of an outer diameter of the stator body 126 to an axial length of the stator assembly 116 (i.e., the distance along the axis A between the body's longitudinal ends not including any extending portion of the windings 134) may be, by way of non-limiting example, not less than 1.5 and not greater than 3.5, e.g., in order to satisfy predetermined packing space constraints for a particular application of the electric machine 114, such as in the vehicle powertrain of FIG. 1.

For ease of manufacture, simplified assembly, and increased costs savings, it may be desirable that all of the permanent magnets 120 share an identical, rectangular polyhedron shape. It should be recognized, however, that any one or more or all of the PM bodies may take on innumerable shapes and sizes, including other polyhedral block-type magnets, ring-shaped (annular) magnets, bread-loaf block-type magnets (cross-section with quadrilateral section adjoining semioval section), curved tile magnets, etc. In one non-limiting example, each permanent magnet 120 may have a thickness of about 1.5 mm to 2.5 mm to fit within a slot 130 having complementary dimensions. In at least embodiments, a total mass of magnet material (i.e., the mass of all magnets 120) used by the electric machine 114 may be about 150 grams to about 250 grams. By using less magnetic material but still meeting predetermined operating parameters, costs are reduced. The permanent magnets 120 of the electric machine 114 may all be fabricated from the same material, such as Neodymium Iron Boron (NdFeB); alternatively, any one or more or all of the magnets 120 may employ different materials, such as Samarium Cobalt (SmCo), Aluminum Nickel Cobalt (AlNiCo), or any combination of rare earth magnet materials.

During operation of the electric machine 114, e.g., in a regenerative-charging mode, the rotor assembly 118 is rotated via the motor shaft while the stator assembly 116 is held relatively stationary. In so doing, the permanent magnets 120 are moved past the multiphase stator windings 134; the magnetic field emitted by the permanent magnets 120 generates an electric current in the windings 134 through electromagnetic induction. This induced electric current may be used to power a load (e.g., recharge traction battery pack 30 of FIG. 1). Conversely, during operation of the electric machine 114, e.g., in an engine-cranking mode or torque-assist mode, an electric current is supplied to the stator windings 134 by a suitable power source (e.g., traction battery pack 30). Passing the supplied current through the multiphase stator windings 134 will generate a magnetic field at the stator teeth 136. The magnetic field output from the stator teeth 136 interacts with the permanent magnets 120 in the rotor assembly 118 such that the rotor body 128 and attached motor shaft rotate to generate a rotary driving force.

Figure 4:
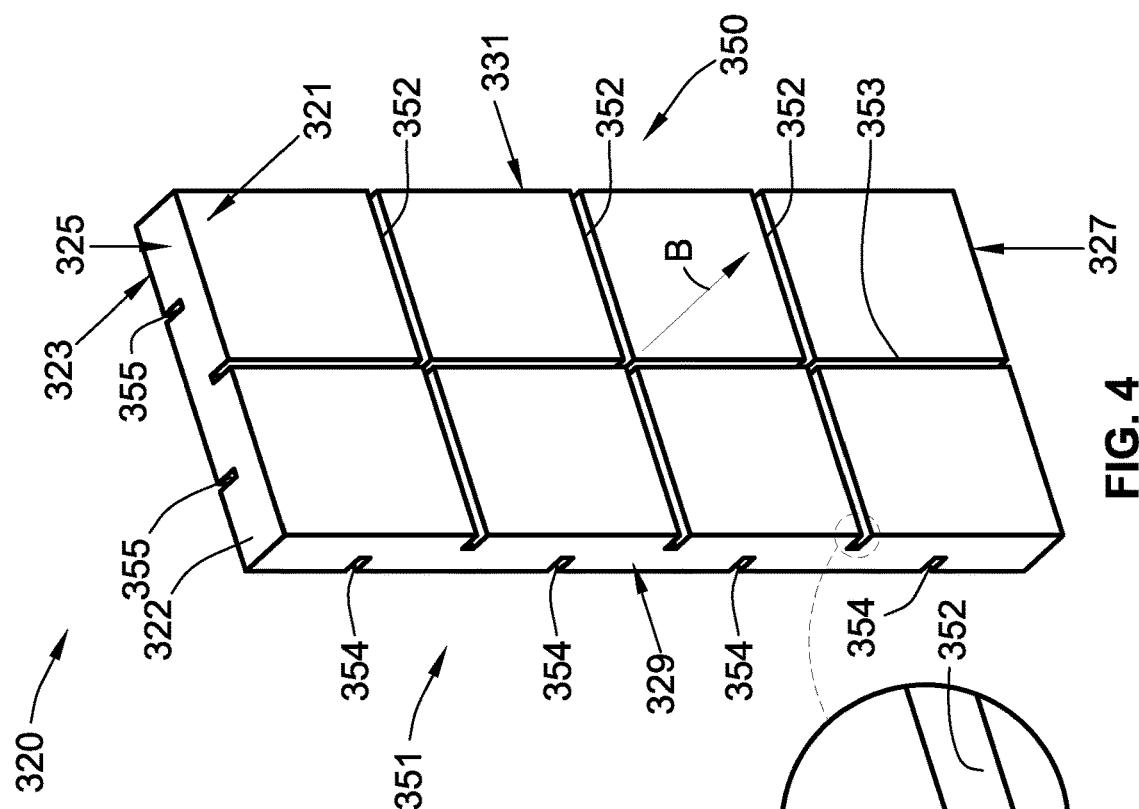
FIG. 4 is a perspective-view illustration of another representative slotted PM in accordance with aspects of the present disclosure.
Figure 3:
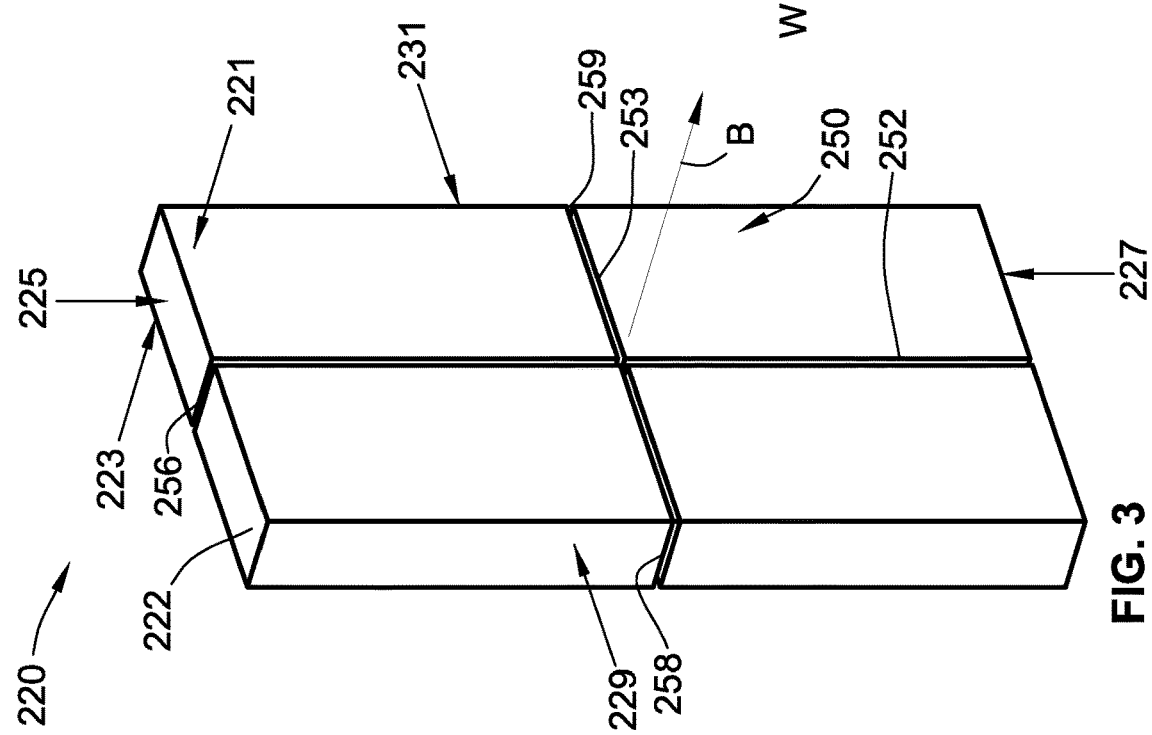
FIG. 3 is a perspective-view illustration of a representative slotted permanent magnet (PM) in accordance with aspects of the present disclosure.
Figure 5:
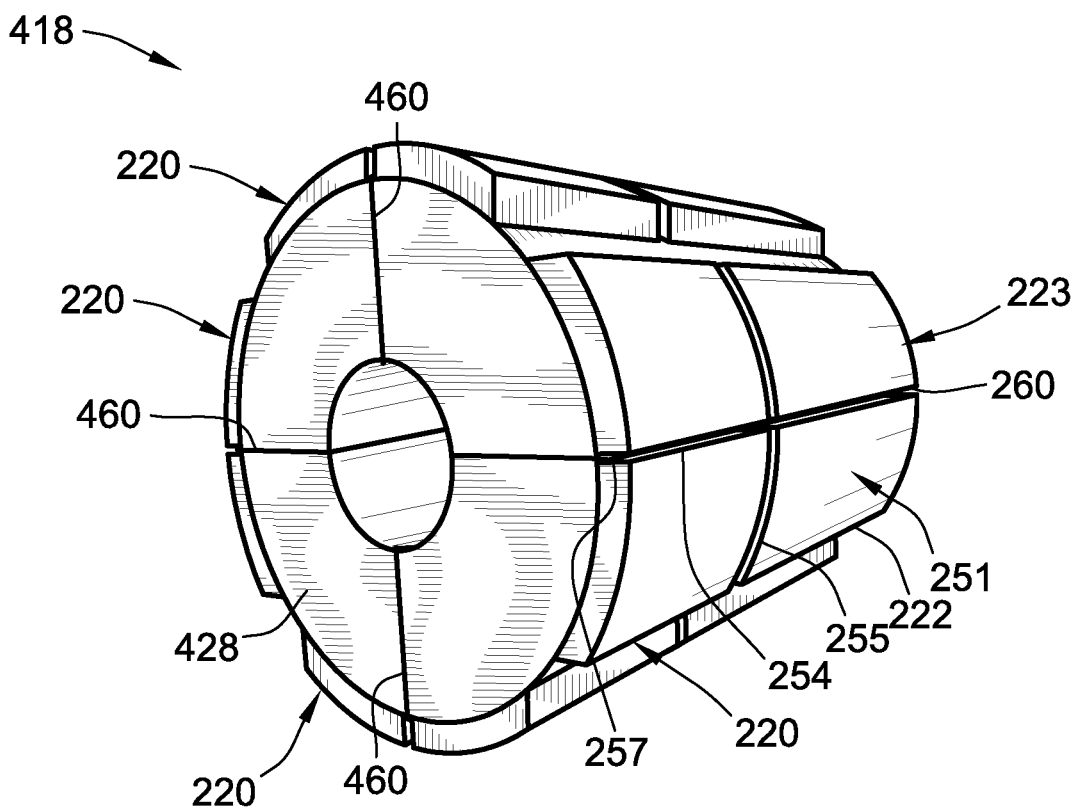
FIG. 5 is a perspective-view illustration of a representative rotor with multiple surface-mounted slotted PMs in accordance with aspects of the present disclosure.

FIGS. 3 and 4 illustrate two examples of slotted permanent magnets 220 and 320, respectively, that may be mounted to the rotor 23 of FIG. 1, the rotor 118 of FIG. 2, or either of the rotors 418 and 518 of FIGS. 4 and 5, for example. Each permanent magnet 220, 320 includes a rigid, single-piece PM body 222, 322 that may be fabricated from any suitable permanent magnet material using any appropriate manufacturing process. The representative PM bodies 222, 322 of FIGS. 3 and 4 are portrayed as right rectangular cuboids with six (6) rectangular faces: opposing first and second major faces 221, 321 and 223, 323, respectively (i.e., the faces with the largest surface areas), opposing first and second minor faces 225, 325 and 227, 327, respectively (i.e., the faces with the smallest surface areas), and opposing first and second intermediate faces 229, 329 and 231, 331, respectively (i.e., the faces with neither the largest or smallest surface areas). As a right rectangular cuboid, the major faces 221, 321, 223, 323 are substantially parallel to each other and substantially orthogonal to the other PM body faces. As indicated above in the discussion of FIG. 2, each PM body 222, 322 of FIGS. 3 and 4 may take on an assortment of different shapes and sizes; the permanent magnet 220 of FIG. 3, for example, is portrayed in FIG. 5 as a surface-mounted, curved tile magnet in which the major faces 221, 223, have arcuate surfaces. In this regard, it is envisioned that any of the features and options disclosed with reference to the slotted PM 220 of FIG. 3 can be incorporated, singly or in any combination, into the slotted PMs 120 of FIG. 2 and/or the slotted PM 320 of FIG. 4, and vice versa. For at least some applications, each slotted PM 220, 320 may be provided with a field-stabilizing coating, a corrosion-resistant plating, high-resistivity epoxy gap filler, assorted surface treatments, etc.

Both PM bodies 222, 322 of FIGS. 3 and 4 are fabricated with preselected patterns of superficial grooves that are engineered to reduce eddy current losses in the permanent magnets 220, 320 when exposed to a time varying electromagnetic field during operation of the accompanying electric machine. In at least the illustrated examples, the slotted PMs 220, 320 afford a reduction in Solid Loss (watts) of at least about 70-95% compared to an unslotted PM based on three-dimensional (3D) electromagnetic finite element (FE) analysis. Magnet segmentation, in which each magnet region (e.g., rotor slot 130 of FIG. 2) contains discrete, insulated PM segments rather than a single-piece PM, is a conventional technique for reducing rotor losses as it imposes minimal restrictions on machine performance. Segmentation, however, increases the total number of machine parts, which requires additional manufacturing processing and reduced mechanical integrity of the system. The use of engineered surface grooves, as described herein, provides comparable benefits as segmentation while avoiding the additional parts, costs and manufacturing steps associated with segmentation. These grooves are not configured as through-holes and, thus, do not extend through the PM body.

One optional slotted PM configuration utilizes a cruciform groove pattern that is applied to both major faces of the single-piece PM body. The permanent magnet 220 of FIG. 3, for example, has a first set of elongated grooves 250 that is recessed into the surface of the first major face 221, and a second set of elongated grooves 251 (FIG. 5) that is recessed into the surface of the second major face 223. In this example, the first set of elongated grooves 250 is composed of two mutually orthogonal, interconnected rectilinear grooves 252 and 253, and the second set of elongated grooves 251 is also composed of two mutually orthogonal, interconnected rectilinear grooves 254 and 255. Grooves 252 and 254 are mutually parallel and coplanar, elongated longitudinally with respect to the permanent magnet 220. Both grooves 252, 254 are shown extending the entire length of the PM body 222, and interconnected by two end grooves 256 and 257 that are recessed into the minor faces 225, 227, respectively. By comparison, grooves 253 and 255 are mutually parallel and coplanar, elongated laterally with respect to the permanent magnet 220. These grooves 253, 255 are shown extending the entire width of the PM body 222, and interconnected by two end grooves 258 and 259 that are recessed into the intermediate faces 229, 231, respectively. It may be desirable, for at least some embodiments, that the groove pattern consist essentially of two (2) to six (6) rectilinear grooves per major face. While shown extending the entire length and width of the PM body 222, one or more of the rectilinear grooves 253-255 may extend only partway across the PM body 222. In this regard, the end grooves 256-259 may optionally be eliminated.

Another optional slotted PM configuration utilizes a distinct groove pattern for each major face of the of the single-piece PM body. The permanent magnet 320 of FIG. 4, for example, has a first set of elongated grooves 350 that is recessed into the first major face 321, and a discrete second set of elongated grooves 351 that is recessed into the second major face 323. In this example, the first set of elongated grooves 350 is composed of a first series of three mutually parallel, rectilinear grooves 352, each of which extends transversely across the entire width the PM body 322 and is spaced from neighboring transverse grooves 352 along the length of the PM body 322. The first set of elongated grooves 350 also includes a single rectilinear groove 353 that extends longitudinally across the entire length of the PM body 322. This longitudinal groove 353 is perpendicular to all three transverse grooves 352.

In contrast to the first set, the second set of elongated grooves 351 is composed of a second series of four mutually parallel, rectilinear grooves 354, each of which extends transversely across the entire width of the PM body 322 and is spaced from neighboring transverse grooves 354 along the length of the PM body 322. The first set of elongated grooves 350 also includes a second series of two mutually parallel, rectilinear groove 355, each of which extends longitudinally across the entire length of the PM body 322 and is spaced from neighboring longitudinal grooves 355 along the width of the PM body 322. These longitudinal grooves 355 are orthogonally oriented with respect to the transverse grooves 354. While the first set of grooves 350 is portrayed as having a first number of rectilinear grooves (e.g., four total) and the second set of grooves 351 is portrayed as having a distinct, second number of rectilinear grooves (e.g., six total), it is envisioned that the first and second sets of grooves 350, 351 may have the same number of grooves, which may be greater than or less than what the numbers shown in the drawings.

The transverse grooves 352 in the first series of rectilinear grooves 350 of the first major face 321 are longitudinally offset from the transverse grooves 354 in the second series of rectilinear grooves 351 of the second major face 323 such that the grooves 352 are interleaved with the grooves 351 along the length of the PM body 322. In the same vein, the longitudinal groove 353 in the first series of rectilinear grooves 350 of the first major face 321 is laterally offset from the longitudinal grooves 355 in the second series of rectilinear grooves 351 of the second major face 323 such that the grooves 353, 355 are interleaved with one another along the width of the PM body 322. Alternatively, one or more of the transverse grooves 352 may be coplanar with one or more of the transverse grooves 354, and the longitudinal groove 353 may optionally be coplanar with one of the longitudinal grooves 355. In either of the foregoing optional configurations, one or more or all of the grooves recessed into the first major face 321 may be interconnected with one or more or all of the grooves recessed into the second major face 321, e.g., to form one or more toroidal grooves that extend continuously around the PM body 322.

It may be desirable, for at least some configurations, that the tooling process to create a slotted permanent magnet be performed in planes parallel to the direction of the impinging field. During operation of an electric machine, an induced electromagnetic field with is a vector field density quantity B (e.g., measured in Newtons per meter per ampere) is generated via the stator windings. When passing through a conductive body, such as a rare-earth permanent magnet, the magnetic field density B may induce eddy currents in planes perpendicular to the vector's direction. To increase resistance in the path of the induced eddy currents, the depths of the superficial grooves extend in planes parallel to the direction of the magnetic field density B. Put another way, each groove has a depth D1 (see inset view of FIG. 4) that is substantially parallel to a direction of the magnetic field B that is generated by the electric machine's electrically conductive windings. For eddy current loss reduction, each groove may take on assorted geometric shapes, such as a triangular, oval, or rectangular transverse cross-section. From a magnetic standpoint, it may be desirable that the groove's depth D1 is significantly larger greater than the groove's width W1 (e.g., at least a 3:1 depth to width ratio). It is also envisioned that one or more of the grooves have a distinct shape, size and/or orientation from one or more of the other grooves. The surface grooves in the PM bodies 222, 322 may be filled with high-resistivity bonded magnets (e.g., bonded magnet inserts 260 of FIG. 4) to increase the magnetic and mechanical strength of the slotted PMs 220, 320.

Figure 6:
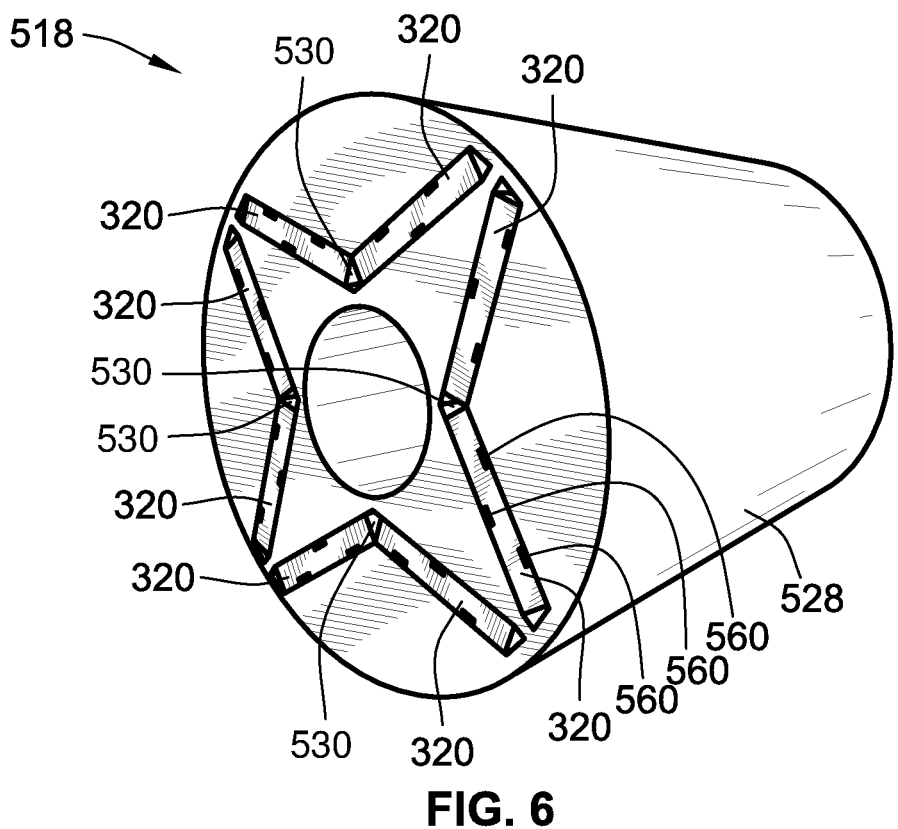
FIG. 6 is a perspective-view illustration of a representative rotor with multiple interior-mounted slotted PMs in accordance with aspects of the present disclosure.

Turning next to FIGS. 5 and 6, any of the herein-described slotted permanent magnets may be surface-mounted or interior-mounted to a complementary support body of an electric machine. FIG. 5, for example, depicts four slotted PMs 220 mounted onto an outer diameter (OD) surface of a rotor assembly 418, spaced circumferentially from one another around the outer perimeter of the rotor body 428. In contrast, FIG. 6 illustrates eight slotted PMs 320 mounted within four complementary rotor slots 530, spaced circumferentially from one another around the inner perimeter of the rotor body 528. The surface grooves may also be configured to provide increased mechanical retention between the slotted PMs and their supporting base structure. FIG. 5, for example, illustrates each PM body 222 being fastened to the rotor body 428 using high-strength ties, such as carbon fiber straps 460 that pass through the rectilinear grooves 254, 257 and 258. As another option, FIG. 6 illustrates each PM body 222 being slidably engaged with the rotor assembly 518 and aligned with their respective slots 530 using complementary teeth 560 that project into the slots 530 from the rotor body 528 and into the longitudinal rectilinear groove 353 and 355. While shown as having a generally rectangular cross-section, these teeth 560 and their receiving surface groove 353 and 355 may take the shape of a T-slot joint, dovetail joint, etc. The dimensions of the grooves 353 and 355 and the teeth 560 may be determined based on desired mechanical requirements to withstand any counteracting mechanical forces.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:
1. An electric machine comprising:
a stator defining a stator slot;
an electrically conductive winding disposed in the stator slot;
a rotor movable with respect to the stator; and
a permanent magnet mounted to the rotor, the permanent magnet including a rigid single-piece permanent magnet (PM) body with a first major face on a first side of the PM body, a second major face on a second side of the PM body opposite the first side, first and second minor faces smaller than and adjoining the first and second major faces, a first set of elongated grooves recessed into the first major face and extending across a length and/or width of the PM body, and a second set of elongated grooves recessed into the second major face and extending across the length and/or width of the PM body, each of the grooves having a depth that is substantially parallel to a direction of a magnetic field generated by the conductive windings.

2. The electric machine of claim 1, wherein the first set of elongated grooves includes a first series of rectilinear grooves extending transversely across the width the PM body and spaced from each other along the length of the PM body.

3. The electric machine of claim 2, wherein the first set of elongated grooves further includes a second rectilinear groove extending longitudinally across the length of the PM body and perpendicular to the first series of rectilinear grooves.

4. The electric machine of claim 2, wherein the first set of elongated grooves further includes a second series of rectilinear grooves extending longitudinally across the length of the PM body and spaced from each other along the width of the PM body.

5. The electric machine of claim 4, wherein the grooves in the first series of rectilinear grooves are mutually parallel, the grooves in the second series of rectilinear grooves are mutually parallel, and the grooves in the first series of rectilinear grooves are perpendicular to the grooves in the second series of rectilinear grooves.

6. The electric machine of claim 1, wherein the first and second sets of elongated grooves extend across the entire length and/or width of the PM body.

7. The electric machine of claim 1, wherein each groove in the first set of elongated grooves has a rectangular transverse cross-section.

8. The electric machine of claim 1, wherein each groove in the first set of elongated grooves is filled with a bonded magnet and/or an epoxy.

9. The electric machine of claim 1, wherein the PM body has a rectangular polyhedron shape, a toroidal shape, a curvilinear tile shape, or a bread-loaf shape.

10. The electric machine of claim 1, wherein the permanent magnet is mounted on an outer diameter surface of the rotor or is mounted inside a rotor slot defined in the rotor.

11. The electric machine of claim 1, wherein the permanent magnet includes a plurality of permanent magnets mounted to the rotor.

12. An electric machine, comprising:
a stator defining a stator slot;
an electrically conductive winding disposed in the stator slot;
a rotor movable with respect to the stator; and
a permanent magnet mounted to the rotor, the permanent magnet including a rigid single-piece permanent magnet (PM) body with opposing first and second faces, a first set of elongated grooves recessed into the first face of the PM body, and a second set of elongated grooves recessed into the second face of the PM body, each of the grooves having a depth that is substantially parallel to a direction of a magnetic field generated by the conductive windings,
wherein the first set of elongated grooves includes a first number of rectilinear grooves and the second set of elongated grooves includes a second number of rectilinear grooves distinct from the first number of rectilinear grooves.

13. The electric machine of claim 12, wherein each groove in the first set of elongated grooves has a rectangular transverse cross-section.

14. The electric machine of claim 12, wherein each groove in the first set of elongated grooves is filled with a bonded magnet and/or an epoxy.

15. The electric machine of claim 12, wherein the PM body has a rectangular polyhedron shape, a toroidal shape, a curvilinear tile shape, or a bread-loaf shape.

16. An electric machine, comprising:
a stator defining a stator slot;
an electrically conductive winding disposed in the stator slot;
a rotor movable with respect to the stator; and
a permanent magnet mounted to the rotor, the permanent magnet including a rigid single-piece permanent magnet (PM) body with opposing first and second faces, a first set of elongated grooves recessed into the first face of the PM body, and a second set of elongated grooves recessed into the second face of the PM body, each of the grooves having a depth that is substantially parallel to a direction of a magnetic field generated by the conductive windings,
wherein the first set of elongated grooves includes a first series of rectilinear grooves extending transversely across the PM body and spaced from each other along a length of the permanent magnet, and the second set of elongated grooves includes a second series of rectilinear grooves extending transversely across the PM body and spaced from each other along a length of the permanent magnet, wherein the grooves in the first series of rectilinear grooves are interleaved with the grooves in the second series of rectilinear grooves.

17. The electric machine of claim 16, wherein the first set of elongated grooves further includes a second rectilinear groove extending longitudinally across the PM body and perpendicular to the first series of rectilinear grooves, and the second set of elongated grooves further includes a fourth rectilinear groove extending longitudinally across the PM body and perpendicular to the second series of rectilinear grooves, wherein the second rectilinear groove is laterally offset from the fourth rectilinear groove with respect to the PM body.

18. The electric machine of claim 16, wherein each groove in the first set of elongated grooves has a rectangular transverse cross-section.

19. The electric machine of claim 16, wherein each groove in the first set of elongated grooves is filled with a bonded magnet and/or an epoxy.

20. The electric machine of claim 16, wherein the PM body has a rectangular polyhedron shape, a toroidal shape, a curvilinear tile shape, or a bread-loaf shape.

\* \* \* \* \*